United States Patent
Schindler et al.

(10) Patent No.: US 10,147,252 B2
(45) Date of Patent: Dec. 4, 2018

(54) DATA ACQUISITION AND MEASUREMENT ACQUISITION DEVICE FOR A DOOR HANDLE AND ASSOCIATED METHOD

(71) Applicant: Huf Hülsbeck & Fürst GmbH & Co. KG, Velbert (DE)

(72) Inventors: Mirko Schindler, Velbert (DE); Bernd Gerdes, Essen (DE); Sebastian Raulin, Essen (DE)

(73) Assignee: HUF HÜLSBECK & FÜRST GMBH & CO. KG (DE)

( * ) Notice: Subject to any disclaimer, the term of this patent is extended or adjusted under 35 U.S.C. 154(b) by 0 days.

(21) Appl. No.: 15/513,929

(22) PCT Filed: Sep. 7, 2015

(86) PCT No.: PCT/EP2015/070386
§ 371 (c)(1),
(2) Date: Mar. 23, 2017

(87) PCT Pub. No.: WO2016/045952
PCT Pub. Date: Mar. 31, 2016

(65) Prior Publication Data
US 2017/0243423 A1   Aug. 24, 2017

(30) Foreign Application Priority Data

Sep. 24, 2014   (DE) .................. 10 2014 113 832

(51) Int. Cl.
*C07C 9/00* (2006.01)
*G07C 9/00* (2006.01)
(Continued)

(52) U.S. Cl.
CPC .......... *G07C 9/00309* (2013.01); *H04L 12/40* (2013.01); *B60R 25/2045* (2013.01);
(Continued)

(58) Field of Classification Search
None
See application file for complete search history.

(56) References Cited

U.S. PATENT DOCUMENTS 6,847,289 B2 *   1/2005   Pang ................. B60R 25/246
                                                     307/10.1
6,933,831 B2 *   8/2005   Ieda ................. B60R 25/246
                                                     340/426.1
(Continued)

FOREIGN PATENT DOCUMENTS

DE   102013102701   9/2014
FR   2915331   10/2008

OTHER PUBLICATIONS

PCT Search Report & Written Opinion dated Nov. 11, 2015 for PCT/EP2015/070386 filed Sep. 7, 2015 entitled Data Acquisition and Measurement Acquisition Device for a Door Handle and Associated Method.

*Primary Examiner* — K. Wong
(74) *Attorney, Agent, or Firm* — Fish IP Law, LLP

(57) ABSTRACT

The invention relates to a device (10) for data acquisition and measurement acquisition for a door handle (2) of a vehicle (1), said device comprising: at least one communications device (11), in particular an NFC device (11) for NFC data exchange with an external communications terminal (3); and at least one sensor device (12) for measuring (20) a change in capacitance.

Figure 1B:
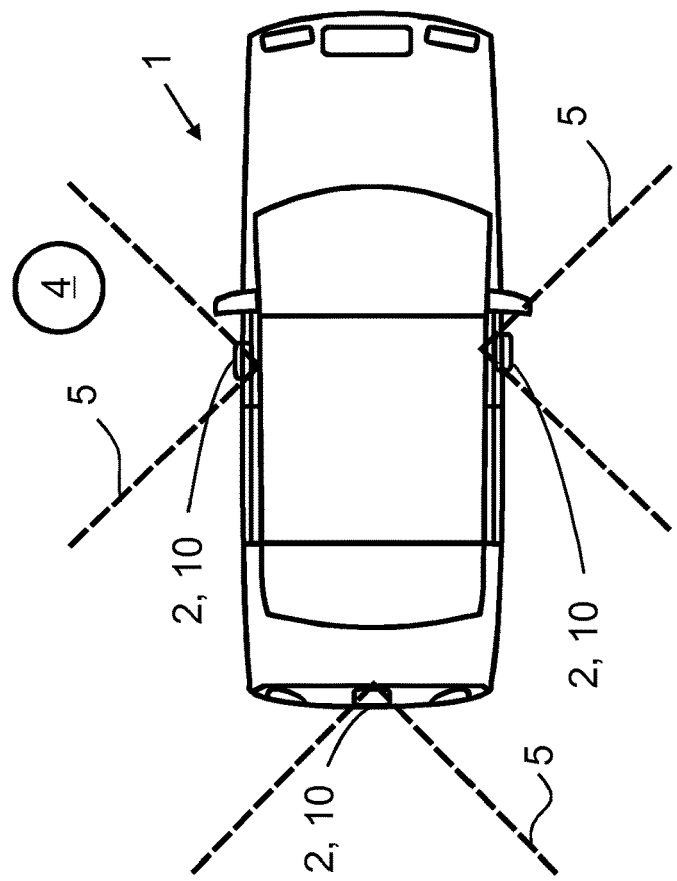

According to the invention, just one voltage device (14) is provided for common adjustment of the voltages of the at least one communications device (11) and the at least one sensor device (12).

16 Claims, 11 Drawing Sheets

(51) Int. Cl.
*H04L 12/40* (2006.01)
*B60R 25/20* (2013.01)

(52) U.S. Cl.
CPC .............. *G07C 2009/00769* (2013.01); *G07C 2009/00777* (2013.01); *G07C 2209/64* (2013.01); *G07C 2209/65* (2013.01); *H04L 2012/40273* (2013.01)

(56) References Cited

U.S. PATENT DOCUMENTS

| | | | |
|---|---|---|---|
| 8,410,899 B2 * | 4/2013 | Stevenson | A61N 1/08 340/5.61 |
| 8,451,087 B2 * | 5/2013 | Krishnan | B60J 5/04 292/221 |
| 9,050,943 B2 * | 6/2015 | Muller | B60R 25/246 |
| 9,302,675 B2 * | 4/2016 | Schilling | G08C 17/02 |
| 9,536,365 B2 * | 1/2017 | Wisnia | G08C 17/02 |
| 2008/0100522 A1 | 5/2008 | Inaba | |
| 2009/0256677 A1 | 10/2009 | Hein | |
| 2014/0015597 A1 | 1/2014 | Tabata | |

\* cited by examiner

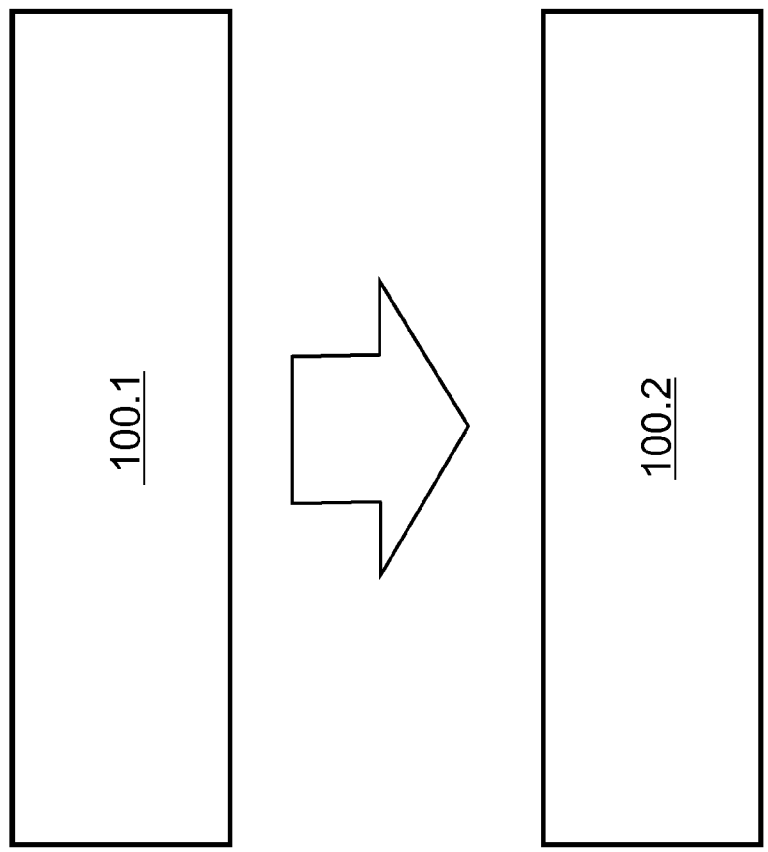

DATA ACQUISITION AND MEASUREMENT ACQUISITION DEVICE FOR A DOOR HANDLE AND ASSOCIATED METHOD

The invention relates to a device for acquisition of data and measurements for a motor vehicle door handle according to the preamble of claim 1. In addition, the invention relates to a process for operating a device for data and measurement acquisition according to the preamble of claim 10.

The use of communication devices such as NFC devices as well as sensor devices collectively in the area of the door handle of a vehicle, in particular of a motor vehicle, is known from prior art. Capacitive sensors that can be used as proximity sensors to detect the approach of an object, for example, a hand, by measuring capacitance variation are used as the sensors here. When there is a corresponding detection, a function of the vehicle, for example, an authorization request is initiated for authentication with an electronic key, for example, an identification transponder (ID transponder). Interfering influences represent a problem and cause an erroneous activation of the sensor. In this context, frequent erroneous activation of the sensor, for example, can result in a correspondingly frequent activation of the authorization request and lead to high power consumption or discharging of the vehicle battery. Erroneous activations of this sort can be caused by external influences (such as rain in the area of the door handle) that cause a change in capacitance. This capacitance variation is then incorrectly detected as approach of an object. A further significant cause of erroneous activations is represented by fluctuations in the supply voltage. For this reason, it is necessary for the sensor to be operated with its own voltage device for voltage adjustment (voltage control). Especially problematic are communication devices like NFC devices, which require very high electrical output while operating, which can cause particularly relevant disruptions in the capacitance measurements of the proximity sensor. By using its own, separate power supply for voltage adjustment (voltage control) for the respective individual devices, such as the sensor device and the NFC device, as constant an operating voltage as possible can be provided for the sensor.

It has proved to be a disadvantage that known devices for data and measurement acquisition—because of the necessary separate voltage adjustment, in particular by at least two different power supplies—comprise more space, are more expensive to manufacture and, in addition, require more maintenance.

It is therefore the object of the present invention to at least partially eliminate the previously described disadvantages. In particular, it is the object of the present invention to provide a reliable and simultaneously cost-efficient design of a device for data and measurement acquisition.

The preceding task is achieved by a device having the features of claim 1, a method having the features of claim 10, a door handle having a device according to the invention for data and measurement acquisition as well as a vehicle having at least one door handle according to the invention and a device according to the invention for data and measurement acquisition. Further features and details of the invention are derived from the respective dependent claims, the description and the drawings. Features and details that are described in connection with the device according to the invention, obviously also apply in connection with the method according to the invention, the door handle according to the invention, as well as the vehicle according to the invention, and vice versa in each case, so that mutual reference is always made or can always be made to the individual aspects of the invention with regard to the disclosure.

The device according to the invention is used for data and measurement acquisition for a door handle of a vehicle, in particular a motor vehicle, using at least one communication device, in particular an NFC device for NFC data exchange with an external communication device, and at least one sensor device, in particular for measuring a change in capacitance. In this arrangement, precisely one, in particular only one power supply is provided for the conjoint voltage adjustment of the at least one communication device, in particular an NFC device, and the at least one sensor device. Features that are described below in connection with the NFC device obviously also apply here in connection with the communication device. Thus, the communication device for data exchange with an external communication device can also have, for example, a standard Bluetooth interface, a mobile interface, a wireless interface and/or an equivalent instead of the NFC device.

The previously described voltage device can have a voltage regulator and/or a voltage stabilizer for conjoint voltage adjustment, or be designed as a voltage regulator and/or as a voltage stabilizer. The voltage adjustment thus describes in particular a voltage regulator and/or a voltage stabilizer for the operating voltage of the NFC device or the sensor device. To this end, the power supply can be operated with a supply voltage in a range of, for example, 5 V to 27 V and/or 4 V to 10 V, and/or have this supply voltage as the input signal. The supply voltage is then especially adaptable or adjustable by the power supply in accordance with a predetermined operating voltage level. The predetermined operating voltage level will depend in particular upon the operating voltage with which reliable operation of the NFC device or the sensor device is possible. An ideal operating voltage for the NFC device can be, for example, essentially 3.3 V and for the sensor device essentially 2.5 V. It is conceivable, however, that deviations from this ideal operating voltage are tolerable within the range of +/−1V, +/−2V, for example, and/or at most +/−3 V. The NFC device and/or the sensor device is then adapted so that reliable operation is still possible in this range. For this reason it is possible to enable a conjoint voltage adjustment using exactly one voltage device, by operation of both the NFC device and the sensor device using an equal, defined operating voltage of, for example essentially 3.3 V. This has the advantage that precisely one, in particular only one, conjoint voltage device (this means, for example, a voltage regulator) is necessary to operate the NFC device as well as the sensor device and the expense as well as the installation space for a second voltage device can be spared.

It is thus conceivable that the voltage device can be designed as an electrical voltage regulator. The voltage device can, for example, be a linear regulator, such as a quadrature regulator and/or an in-phase regulator and have an electrical component for voltage adjustment, such as a Zener diode. In addition, the voltage device can also be designed as a low-drop voltage regulator in which a MOSFET integrated into the voltage device is used. A low-drop voltage regulator is thus designed as an in-phase regulator arranged so that a reduced minimum required difference between input and output voltage is necessary. This property is achieved, for example, by using a pnp transistor on a series arm of the voltage device. Thus it can be possible that the voltage device is operated with an input voltage of, for example, 5 to 27V and outputs a voltage of essentially 3.3 V. The voltage device can, for example, allow the output voltage to have a deviation of less than 1%, 2%, 4% and/or 5% of the set value (for, example, the 3.3 V). It may also be possible for the output voltage to have a deviation from the set value that is two, three, or four times lower than the input voltage. This achieves the advantage that, by using the voltage device, a more secure operation of the NFC device and/or the sensor device is possible than with direct power supply from the supply voltage. For this purpose, the voltage device can be directly connected to the NFC device and/or the sensor device, which means that no further voltage adjustment takes place for the NFC device or the sensor device downstream of the voltage device.

It can further be possible that the sensor device is used exclusively for capacitance measurements, or that the measurement of capacitance variation can be conducted exclusively via the sensor device and/or via sensor units of the sensor device. The sensor device has, for example, only sensors for capacitance measurement, thus allowing for a simplified structure of the sensor device. It can further be provided that the sensor device has proximity sensors to detect the approach of an object, such as a hand, by measuring a variation in capacitance. For capacitance measurement, the sensor device can have a circuit, for example, by which a capacitance difference can be measured across sensor electrodes of the sensor units or the sensor device via frequency measurement, impedance measurement, charge-time measurement and/or via a (capacitor) transfer process. The sensor electrodes or sensor units thus form a capacitor whose capacitance can be changed by an object approaching it. With the detection of a capacitance variation, the approach of an object can also be detected. To measure the capacitance variation, a clocked discharge of a reference capacitor at a reference voltage by, for example, transferring to a sensor electrode is performed, for example, according to the transfer procedure. The reference capacitor can thus be switched parallel to the capacitance to be measured, meaning to the sensor electrode. In addition, an evaluation and control device can be provided that, for example, has at least one comparator and at least one clock generator. In this way, a number of transfer procedures can be measured, meaning the clock and/or discharge pulses necessary for discharging, which are needed to determine the reference voltage. This number and/or the time needed for discharging is thus a measurement for the capacitance to be measured. This allows easy and efficient capacitance measurement.

In the device according to the invention, the sensor device together with the NFC device can preferably be arranged in/on the door handle. Because the approach of an object, in particular of an operator or the hand of an operator, towards the vehicle can be detected by the sensor device to trigger, for example, an identification process, an arrangement of the sensor device in close proximity to the NFC device is especially advantageous. The NFC device is then a communications means according to the NFC standard (Near Field Communication). NFC technology is a contactless, inductive communication technology. It operates within a frequency range of 13.56 MHz and provides a data transfer rate of up to 424 kilobits per second at a range of up to 10 cm. NFC technology is especially compatible with smart card systems or smart card infrastructures, for example, based on ISO/IEC 14443A (such as NXP's Mifare technology), as well as Sony's FeliCa card, which is used for electronic tickets in public transport and for payment applications. Thus, the NFC device via the NFC data exchange can, for example, be used directly for the authentication of the operator by e.g. in which a code from the external communication device is transferred over the NFC data exchange to the vehicle. In addition to an authorization request via NFC data exchange, an exchange of vehicle parameters, for example, is also conceivable, as will be further detailed below. The communications device can thus be, for example, an ID transmitter, a mobile phone, a (tablet) computer, a money card and/or a smart card, etc., that an operator would normally carry with him. An arrangement on the door handle or in that area of the sensor device is therefore useful, so that the distance to the operator or to the communication device is reduced. For example, a request from the NFC device could also be initiated via a proximity detection by the sensor device.

Advantageously, it can be provided within the framework of the invention that the sensor device has an evaluation and control device and at least one sensor unit, in particular a capacitive sensor, a control of both the NFC device and the at least one sensor preferably being implementable via the evaluation and control device. The evaluation and control device can in particular be designed as a monolithic circuit, in particular as an integrated circuit or microcontroller and, for example, be integrated into a SMD (surface-mounted device) on a circuit board of the device according to the invention. In addition, the evaluation and control device can comprise the voltage device or form a monolithic circuit together with, for example, the voltage device. The sensor unit can thereby form a measurement capacitor for the purpose of, for example, capacitance measurement, by having a wire and/or at least one electrically conductive electrode so that a change in capacitance of the sensor unit is caused by the approach of an object to the at least one electrode. The change in capacitance is detected by the evaluation and control device, for example, in particular via the transfer procedure, in which—as was already described—the pulses to reach a reference voltage are accumulated. For this measured-value acquisition, meaning the detection of the change in capacitance, the evaluation and control device can be electronically connected to the sensor unit, for example via the at least one cable and/or wire and/or wirelessly. Basically, as constant and stable an operating voltage as possible is necessary for the measurement of the sensor device, meaning for determining the change in capacitance of the sensor units, so that reaching a reference voltage is reliably attributed to a change in capacitance. A voltage fluctuation that is caused, for example, by an operation, meaning a request and/or a data exchange of the NFC device, can affect the operational voltage of the sensor device. An erroneous triggering of the sensor device can be caused by the voltage fluctuation since the reference voltage can also be accumulated without any actual chance in capacitance. Because the NFC device and the sensor device are connected to only or precisely one conjoint voltage device for conjoint voltage adjustment, the influence of a voltage fluctuation caused by the NFC device is particularly relevant. To avoid such an erroneous triggering, simultaneous operation in particular of the NFC device and the sensor device or the sensor unit is therefore prevented and/or blocked by the evaluation and control device. Thus the evaluation and control device, for example, can serve both for control and/or evaluation of the NFC device or sensor unit (meaning at least on sensor unit) and/or can be used exclusively for control and/or evaluation of the sensor device. According to the latter alternative, it can be provided that the NFC device has its own evaluation device, which processes the data of the NFC data exchange. The evaluation and control device thus has, for example, functions either exclusively for capacitive measurement with the sensor device or can advantageously also assume functions for an NFC data exchange or corresponding data analysis. Basically, the evaluation and control device can be suitable for conducting control and/or operation of the sensor device, in particular in that the evaluation and control device (electrically) controls at least one and/or all sensor units of the sensor device. The advantage is thereby achieved that the evaluation and control device results in reliable and efficient data and measurement acquisition.

The expressions "operation of the sensor device" or "measurement of the sensor device thus refer to the measurement, measured-value acquisition and/or evaluation of the capacitance measurement and/or control, activation and/or power supply for the sensor device or sensor units by the evaluation and control device. The expression "operation of the NFC device" preferably refers here to a request, evaluation, generation and/or utilization of data from an NFC data exchange and/or control, activation and/or power supply for the NFC device. In the operation of an NFC device, for example a polling for transmitting an interrogation pulse (for detecting a communication-capable communication device), a data exchange with the communication device and/or evaluation and generation of data for data exchange is also carried out. The expression "control" can also mean the evaluation, operation, measurement, current or voltage supply and/or data communication.

In a further possibility, it can be provided that the evaluation and control device is electrically connected to the NFC device and/or at least one sensor unit of the sensor device in order to carry out detection of input signals and/or output signals, and in particular measurement disruptions caused by the NFC device can be reduced, by the detected input signals and/or output signals being monitored by the evaluation and control device. The evaluation and control device can accordingly be used to recognize voltage fluctuation caused by operation of the NFC device. This voltage fluctuation causes, for example, an invalid measurement by the sensor device, in particular a faulty change in capacitance or an erroneous triggering of a sensor unit of the sensor device. It can thus be possible that the voltage fluctuation is recognized directly by the evaluation of the input signal and/or output signal by the evaluation and control device, for example, when defined limits are exceeded. It is also conceivable that simultaneous operation or simultaneous evaluation of the NFC device and the sensor device can generally be avoided, that the input signals and/or the output signals can be monitored and the NFC device and the sensor device can in particular be controlled in dependence on the input and/or output signals. The evaluation and control device thus controls in particular the adjustment or blocking of simultaneous operation of the sensor device when the NFC device is operation (meaning the measurement of changes in capacitance by the sensor units). In particular, the evaluation and control device of the sensor device always, that is, constantly, continues to operate since it must assume the corresponding control of the sensor device. Measurement disruptions can thus be hindered or reduced effectively.

Furthermore, it can be provided in the device according to the invention that the conjoint voltage adjustment of the NFC device and the sensor device, in particular of an evaluation and control device and/or of a sensor unit of the sensor device, can be directly carried out by the voltage device, the evaluation and control device in particular being electrically connected to at least one sensor unit in order to supply power for the at least one sensor unit. It is thus conceivable that the NFC device and/or the sensor device is electrically connected to the voltage device for direct voltage adjustment. Similarly, it may be possible that the voltage adjustment and power supply for the NFC device and the evaluation and control device be carried out directly, i.e. immediately, via the voltage device and the power supply for the sensor units directly or immediately by the evaluation and control device. Also in the aforementioned case, the voltage adjustment of the sensor units of the sensor device takes place directly through the voltage device, since the voltage units are directly affected by the voltage adjustment of the evaluation and control device via the voltage device. The power supply for the sensor units is thus directly influenced by the voltage adjustment of the voltage device and not by, say, other voltage devices. This has the advantage that both the evaluation and control devices, as well as the sensor units can have a conjoint voltage adjustment.

Advantageously, it can be provided within the framework of the invention that an at least partially simultaneous operation of the NFC device and the sensor device at instant (t1) can be metrologically detected by an evaluation and control unit, wherein the measured value of the sensor device detected at instant (t1) in particular can then be marked as erroneous by the evaluation and control device. Partially indicates in particular an operation that at times overlaps so that this could cause measurement disruptions in the sensor device. This achieves the advantage that the use of an erroneous measurement caused by voltage fluctuation can be excluded from the outset. Conducting a simultaneous measurement evaluation during a concurrent operation is, thus, generally avoided. "Simultaneous operation" thus refers here in particular to when a query and/or a data exchange of the NFC device occurs at the same time as a measurement of a change in capacitance by the sensor device. Although the measurement is then carried out simultaneously, for example, the measured value is nevertheless marked and/or discarded. The marking can, for example, be a flag, which is associated with the measurement value as a binary variable or together with a specific binary code and flags the measured value. This flag is stored with the measured value in a non-volatile memory unit of the device according to the invention, for example. Similarly, it can be possible that the evaluation and control device recognizes voltage fluctuations, which definitely cause an erroneous measurement, and only then correspondingly marks the detected erroneous measurement value.

A further advantage can be achieved within the framework of the invention if the evaluation and control device has a data connection, in particular an SPI connection, to the NFC device and/or at least one sensor unit and/or to the vehicle electronics, in particular data for controlling and/or evaluating being transferable via the data connection. An SPI connection (Serial Peripheral Interface) is here a data connection via a bus system according to the SPT standard. This may be a serial data bus, where the device according to the invention or the evaluation and control device is connected in particular as a slave in the vehicle's bus system. For this purpose, the vehicle can have a corresponding master SPI controller. This controller can, for example, be integrated into a vehicle's electronics, the evaluation and control device being connected to the vehicle electronics via a data connection. The NFC device can thus be connected either directly to the vehicle electronics and/or to the evaluation and control device for data transfer. The data connection to the evaluation and control device thus has the advantage that data from the NFC device can first be received and evaluated by the evaluation and control device and, for example, the operation of the NFC device and/or the sensor device can take place based on this data in order to avoid measurement disruptions in the sensor device. Similarly, it is conceivable that the data connection has, for example, a CAN bus (Controller Area Network) or a LIN bus (Local Interconnect Network).

Advantageously, it can be provided within the framework of the invention that data from the data exchange of the NFC controller can be received, evaluated and/or transferred to an evaluation and control device that can be connected to the vehicle electronics by the evaluation and control device, in particular for implementation of an identification test/authorization, in particular an interface unit being provided for connection to the vehicle electronics. In this manner, the NFC device as well as the sensor device can be used for identification checking with the capacitive sensor elements in recognizing an approach. It is also conceivable that the NFC device is used for other functions. This can be, for example, the transmission of data via the data exchange, which has information about the vehicle and/or the operator. For the data connection, an interface unit of the evaluation and control device can be also be provided that is suitable for communicating in accordance with the data connection of the data exchange (an SPI connection, e.g.).

In a further option, it can be provided within the framework of the invention that a non-volatile memory unit is provided, the non-volatile memory unit including data, and in particular data with information about the vehicle parameters, the data being transferable and/or receivable by the NFC device. The non-volatile memory unit can thus be a ROM memory (read-only memory), a flash memory, an EPROM (erasable programmable read-only memory), EEPROM (electrically erasable programmable read-only memory) and/or a hard drive and/or something similar. The data can, for example, include information about the vehicle parameters and/or about the vehicle that has, for example, the tank fill level, the condition of the lock device, information on open or closed doors and/or windows, parameterization of the sensor device and/or NFC device for maintenance, for example, further maintenance parameters, operator settings and/or operator-specific data (such as the seat positioning, driver's license, etc., for car sharing, etc.). The communication device or the supported communication devices could also have storage that contains the above information and, for example be designed as a mobile phone, laptop and/or smartphone. This has the advantage that it is possible for the communications devices to comprehensively and flexibly search the vehicle parameters. Similarly, for specific applications such as car sharing, for example, operator settings, operator inputs and data from the vehicle could be used and/or recorded.

Advantageously, it can be provided within the framework of the invention that an approach of an object, in particular into a detection area of the door handle, can be detected by the sensor device, in particular by at least one sensor unit, by a change in capacitance that is detectable by at least one sensor unit. The detection area of the door handle can extend, for example, to a distance of up to 0.5 cm, 1 cm, 2 cm and/or 3 cm from the door handle and/or lie in the area of the gripping recess of the door handle. In this manner, the approach of an operator, particularly of a hand of the operator, can be reliably detected, which serves, for example, to open the door. To increase the reliability, it can also be provided, for example, that the sensor device has not only one sensor unit for measuring a change in capacitance and, thus, for detection of an approach, but has and evaluates a plurality of sensor units for error compensation, in particular at least two, three, four and/or at least ten sensor units.

In a further possibility, it can be provided that an approach of an object, particularly in close proximity to the door handle, can be recognized by the NFC device. The close proximity area thus has a narrower distance from the door handle than the detection range of the sensor device or the sensor unit. Since simultaneous operation of the NFC device and the sensor device is prevented or blocked, as appropriate, to prevent erroneous measurements caused by measurement disruption by the sensor device, the sensor device cannot detect any approaches at this instant. This approach detection could, therefore, be taken over, for example, exclusively at these instants, by the NFC device. Thus, a complete detection of an approach by an operator or an object is possible.

Advantageously, it can be provided within the framework of the invention that at least one sensor unit of the sensor device has at least one capacitive sensor element and/or in particular an electrically conductive core, in particular wherein at least two capacitive sensor elements can form a sensor unit and are connected in particular to each other. Using an electrically conductive core, the metrological characteristics of the capacitive sensor element of the sensor device can thus be improved and the measurement area of the sensor element can possibly be expanded.

Further, it is conceivable that a switching unit is provided to switch between a sensor device operation, i.e. in particular at least one sensor unit of the sensor device, and the NFC device in order to reduce measurement disruptions, the switching unit being integrable in particular into the evaluation and control device. In order to prevent sensor device measurement disruptions or invalid (erroneous) measurements, it is also conceivable that, for example, during an operation of the NFC device, the sensor device, meaning in particular the sensor units of the sensor device (without the evaluation and control device) is completely switched off. Thus, only sequential operation of the sensor device and the NFC device is possible via the provided switching unit. For this purpose, a switch unit, in particular a changeover unit, is provided that can be either separate or integrated into the evaluation and control device. At specified instants, for example, those given by a timer of the evaluation and control device, switching can occur between an operation of the sensor device and one of the NFC device. It is also conceivable that the NFC device and the sensor device are not completely switched off, but that the measurement acquisition or data acquisition is only activated or deactivated by the switch unit.

Similarly, a method for operating a device for data and measurement acquisition for a door handle of a vehicle, in particular of a motor vehicle, is subject matter of the invention. Provided for this are at least one communication device for NFC data exchange with an external communication device, and at least one sensor device, in particular for measurement of change in capacitance. It is further provided that precisely one, in particular exclusively one, voltage device of the conjoint voltage adjustment serves the at least one communication device, in particular the NFC device, and the at least one sensor device. The method according to the invention thus brings the same advantages as have been discussed in detail in reference to the device according to the invention. In addition, the method according to the invention can be suitable to operate the device according to the invention.

Advantageously, it can be provided within the framework of the invention that the control via the evaluation and control device takes place in such a manner that measurement disruptions caused by the operation of the NFC device are prevented, in particular by the evaluation and control device detecting and/or blocking simultaneous operation of the NFC device and the sensor device. Simultaneous operation can be detected, for example, by the evaluation and control device being electrically connected to the NFC device and the sensor device or the individual sensor units and thus monitoring in particular the input signals and/or output signals of the NFC device and/or the sensor device. In this context, for example, disruption and/or simultaneous operation are recognized by the evaluation and control device detecting that the limit values have been exceeded and/or detecting specific voltage profile patterns of the input and/or output signals. Simultaneous operation can thus be blocked by the evaluation and control device only sequentially controlling data acquisition and/or operation of the NFC device as well as measurement and/or measurement acquisition by the sensor device. In particular, the operation of the NFC device, meaning in particular the transmitting of interrogation pulses for recognition of a communication-ready communication device, and the NFC data exchange with the external communication device require a very high electrical power level. This operation of the NFC device is determined by the evaluation and control device either always to specified, firmly-defined instants or in relation to the operation of the sensor device. An operation of the sensor device takes place when, for example, the transfer procedure is carried out in order to determine a change in capacitance, in particular of the sensor units or sensor elements. A corresponding measurement value is thus determined as the quantity of pulses necessary for discharge and the corresponding measurement value evaluated. This operation of the sensor device takes place either always at specified instants and/or depending upon the operation of the NFC device. This sequential operation of the NFC device and the sensor device ensures disruption-free measurement acquisition by the sensor device.

Further, it is conceivable that a measurement by the sensor device is cyclically initiated by the evaluation and control device and a query by the NFC device is carried out in temporal dependency on the measurement, in particular cyclically after a defined number of measurements. The measurement of the sensor device can thus take place, for example, chronologically after a specified period of time, for example a period of time of essentially 25 ms, 50 ms, 75 ms and/or 100 ms. Within this period of time, for example, clock-controlled charge pulses and/or discharge pulses, for example, with a duration of essentially 2 ms, 3 ms and/or 5 ms, are used and/or corresponding cycles are counted in order to determine the change in capacitance. The query by the NFC device takes place, as necessary, also in the intervals of a specified period of time, which, for example, is a multiple (for example, at least double, quadruple and/or ten times) of the first period of time. After a defined number of measurements by the sensor device, a query by the NFC device then always occurs. With this query, for example, by an interrogation pulse, the NFC device can determine whether a communication-ready communication device is located in the proximity of the NFC device. Proximity thus refers to the maximum transmission and reception range of the NFC device. This has the advantage that a coordinated measurement procedure can be done in a reliable manner.

Advantageously, it can be provided within the framework of the invention that the NFC device and the sensor device, in particular an evaluation and control device of the sensor device, are operated via the voltage device with the same electrical operating voltage and/or are connected to the same electrical potential, in particular a voltage for operating a sensor unit of the sensor device being directly and/or exclusively dependent upon this operating voltage. The operating voltage is thus, for example, 3.3 V, which is similarly appropriate for reliable operation of the sensor device (and thus also, as appropriate, for the sensor units, which are dependent upon it, since they are supplied with current by the evaluation and control device). This has the advantage that both the sensor device and the NFC device are operated with an equal voltage and thus only one voltage device must be provided. Moreover, this simplifies the circuit design significantly.

Furthermore, it may be advantageously provided that a query, in particular an interrogation pulse, is cyclically carried out by the NFC device to detect such a communication-ready external communication device, in particular in proximity to the door handle, such a query by the NFC device always being metrologically detected by the evaluation and control device (via the monitoring of input and/or output signals by the NFC device, for example). Because an authentication query, for example, should take place as soon as possible when an operator approaches, the polling, meaning the regular, cyclical interrogation by the NFC device for recognition of a communication-ready external communication device, has the advantage that an authentication process via the NFC device, for example, can be triggered in a timely manner. For the querying, interrogation signals (meaning, for example, interrogation pulses) are generated by a transmission of electromagnetic alternating fields (in particular in a frequency range of 13.56 MHz), which, for example, can run a passive NFC transponder in the external communication unit using capacitive coupling. Passive as well as active transponders can then be used to detect and evaluate the query signal, and then likewise send a response signal to the NFC device. The NFC data exchange can then begin as necessary, for example, to authenticate the operator or the communication device. To initiate the query and/or the (bidirectional) NFC data exchange, the measurement by the sensor device can also be used, as appropriate, so that, for example, a recognized approach of the operator triggers the interrogation pulse via the sensor device. An interrogation pulse can also only then be triggered, as appropriate, if the sensor device recognizes a specific, predetermined pattern of movement.

Advantageously, it can be provided within the framework of the invention that erroneous measurements in the measurement of the sensor device are thus prevented and/or reduced by the NFC device and the sensor device being operated sequentially. The sequential operation thus refers to the occurrence of a measurement evaluation and/or an operation of the sensor device (that is, the measurement of a change in capacitance, in particular by the sensor units) exclusively before and/or after an operation of the NFC device (meaning, for example, a query and/or a data exchange by the NFC device with a communication device). It can additionally be provided that, given a necessary operation of the NFC device (for example, with a communication-ready communication device), the operation of the NFC device has priority over the operation of the sensor device. This effectively avoids errors of measurement by the sensor device.

In a further possibility, it can be provided that, upon recognition of a communication-ready external communication device, the NFC device initiates in particular a data exchange and, for example, simultaneously sends an interrupt request to the evaluation and control unit, the evaluation and control device interrupting the measurement acquisition of the sensor device during the data exchange, in particular because of the interrupt request. The operation of the sensor device is thus indirectly interrupted or paused by the NFC device during an operation of the NFC device, in particular via the transmission of the interrupt request. The interrupt request can, for example, take place in such a manner that the NFC device causes a potential change to an IRQ input (Interrupt Request) from the evaluation and control unit. The evaluation and control unit thus immediately interrupts, for example, the further operation of the sensor device, so that no erroneous measurements can be used by which a vehicle function such as an authentication would be activated, for example.

In addition, it can be provided within the framework of the invention that the evaluation and control unit carries out the measurement acquisition via the sensor device depending upon an output signal from the NFC device and/or from the evaluation and control device to the input signal sent by the NFC device. In this manner, simultaneous operation or simultaneous control of the NFC device and the sensor device can be avoided by using a simple, circuit technology solution.

In addition, a door handle, in particular a motor vehicle door handle having a device according to the invention, is a subject of the invention. Additionally, a vehicle, in particular a motor vehicle with a door handle according to the invention and/or a device according to the invention, is a subject of the invention. The door handle according to the invention and the vehicle according to the invention bring the same advantages as were discussed in detail with reference to the device according to the invention.

Figure 1A:
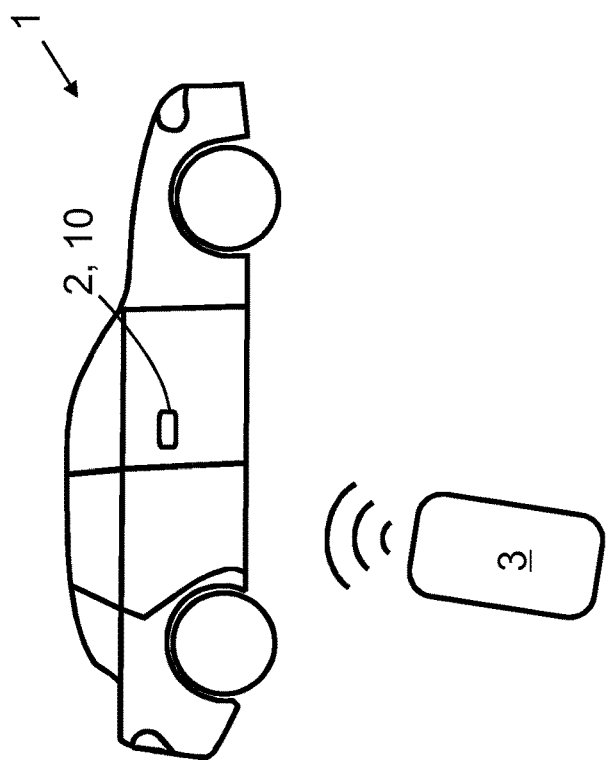
Figure 2:
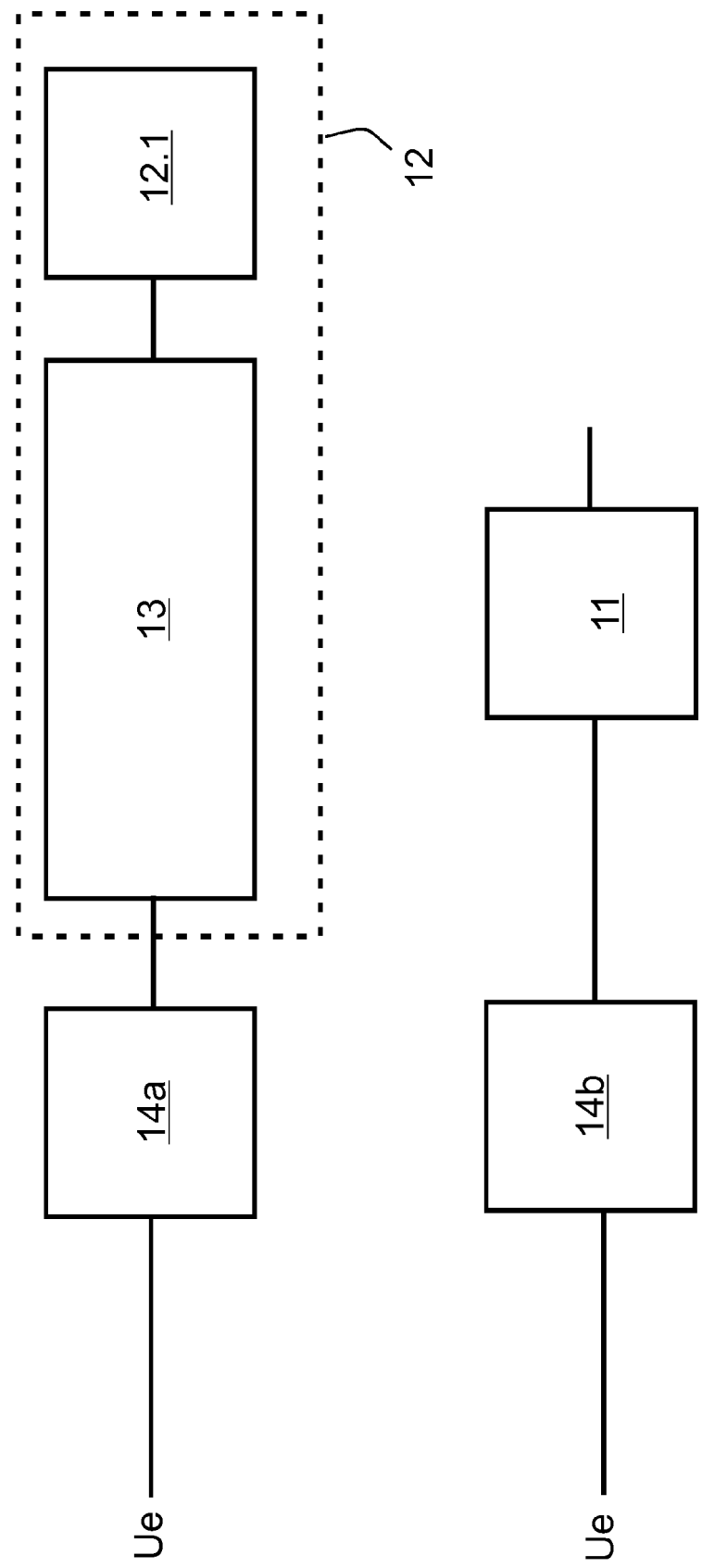
Figure 3:
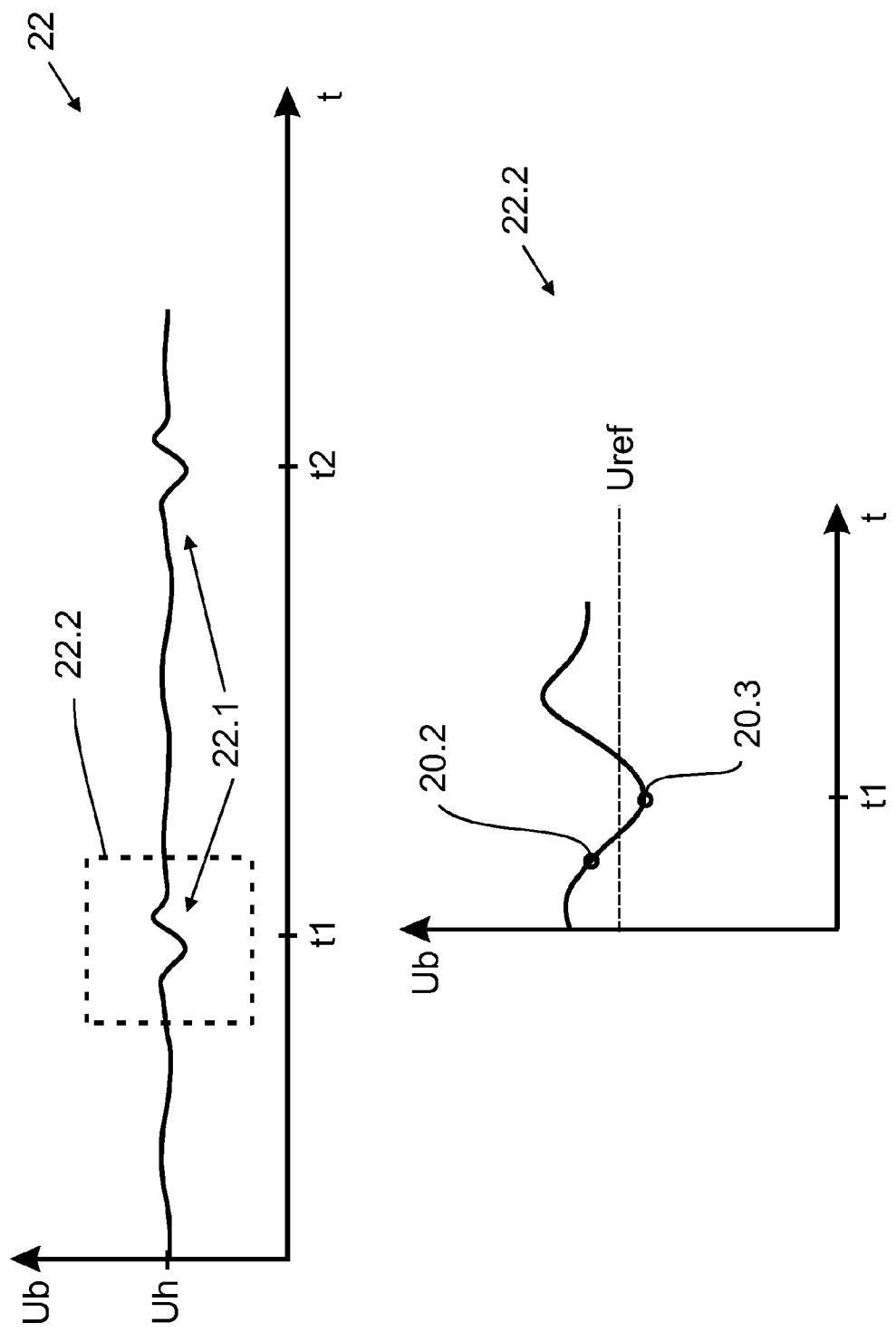
Figure 4:
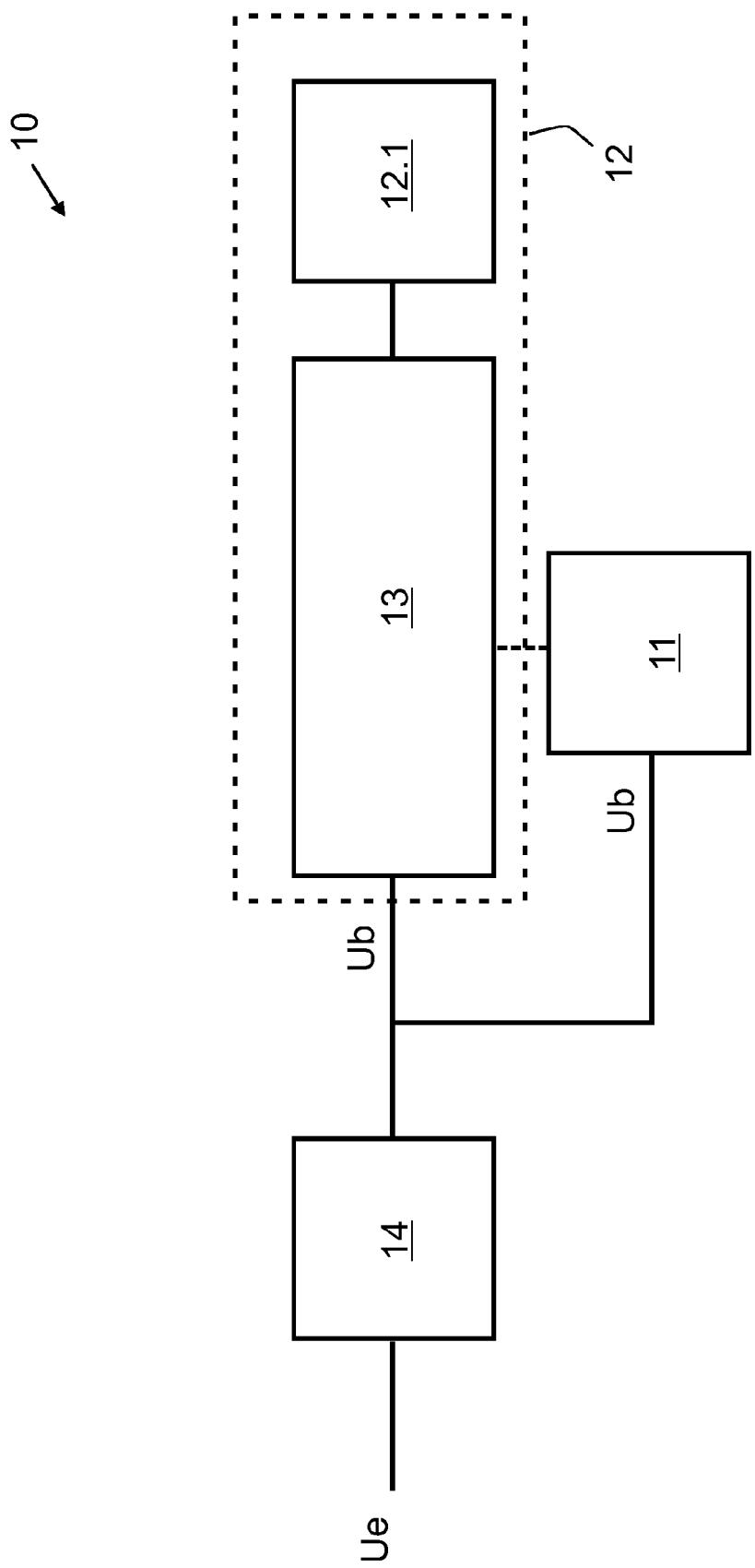
Figure 5:
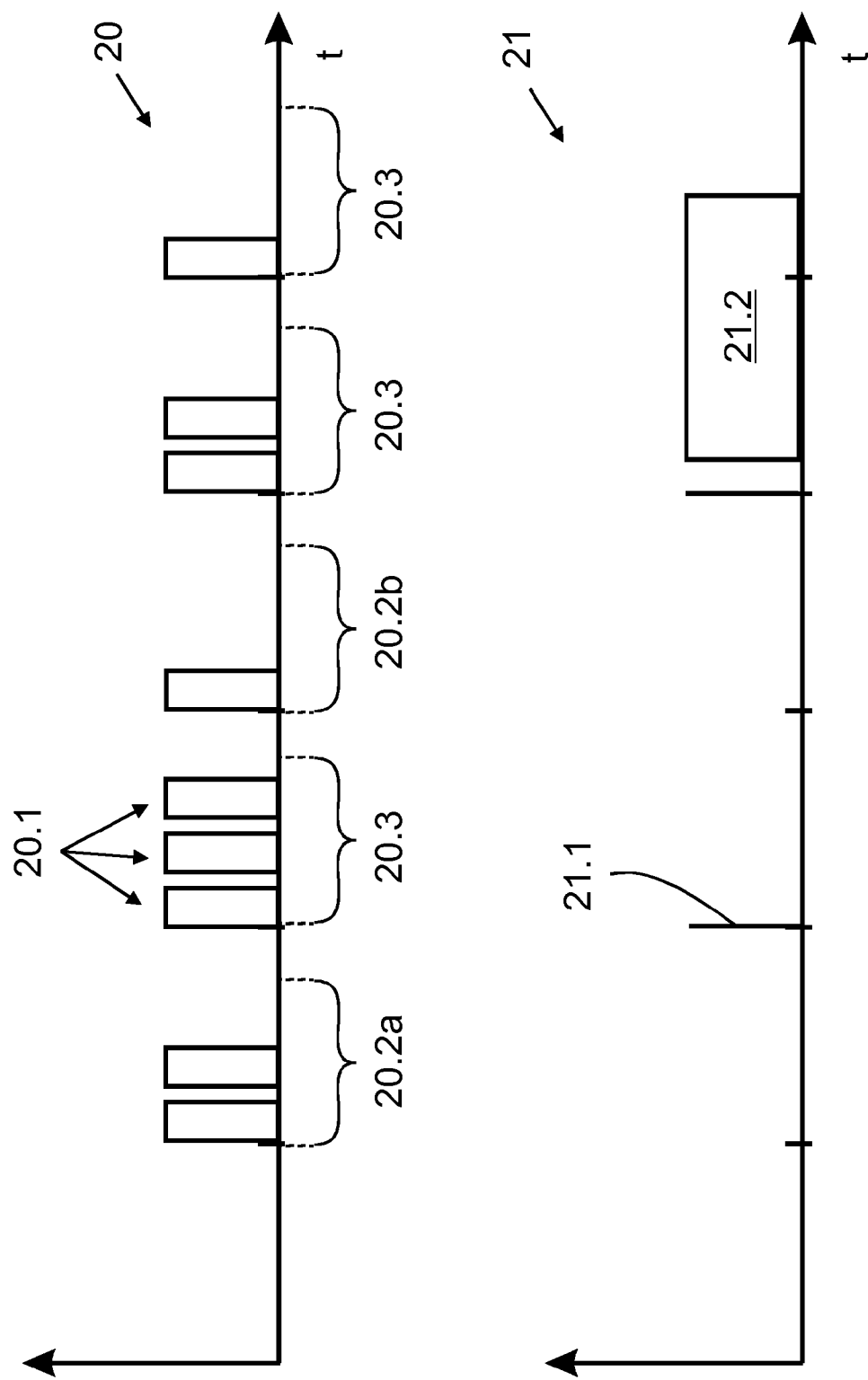
Figure 6:
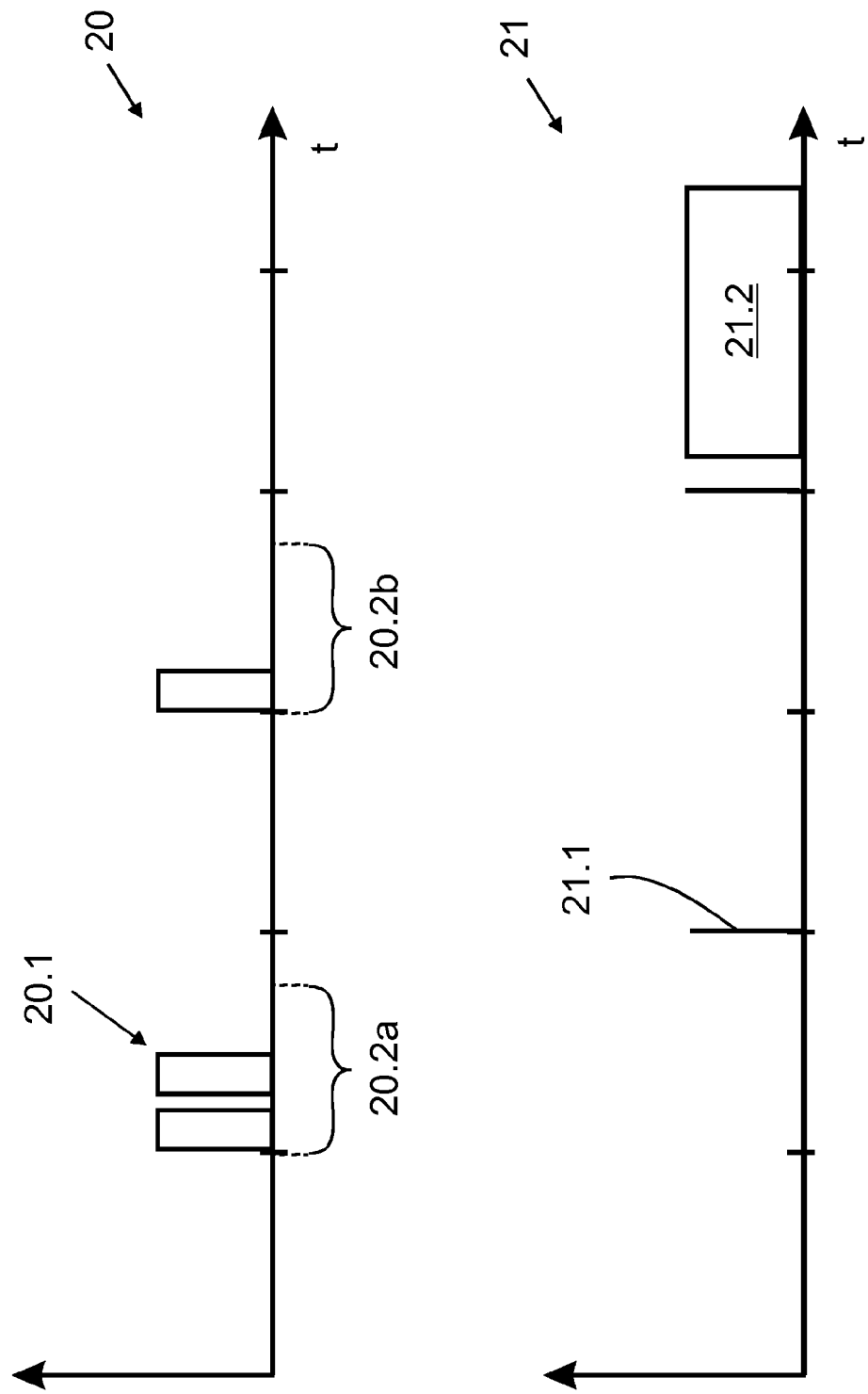
Figure 7:
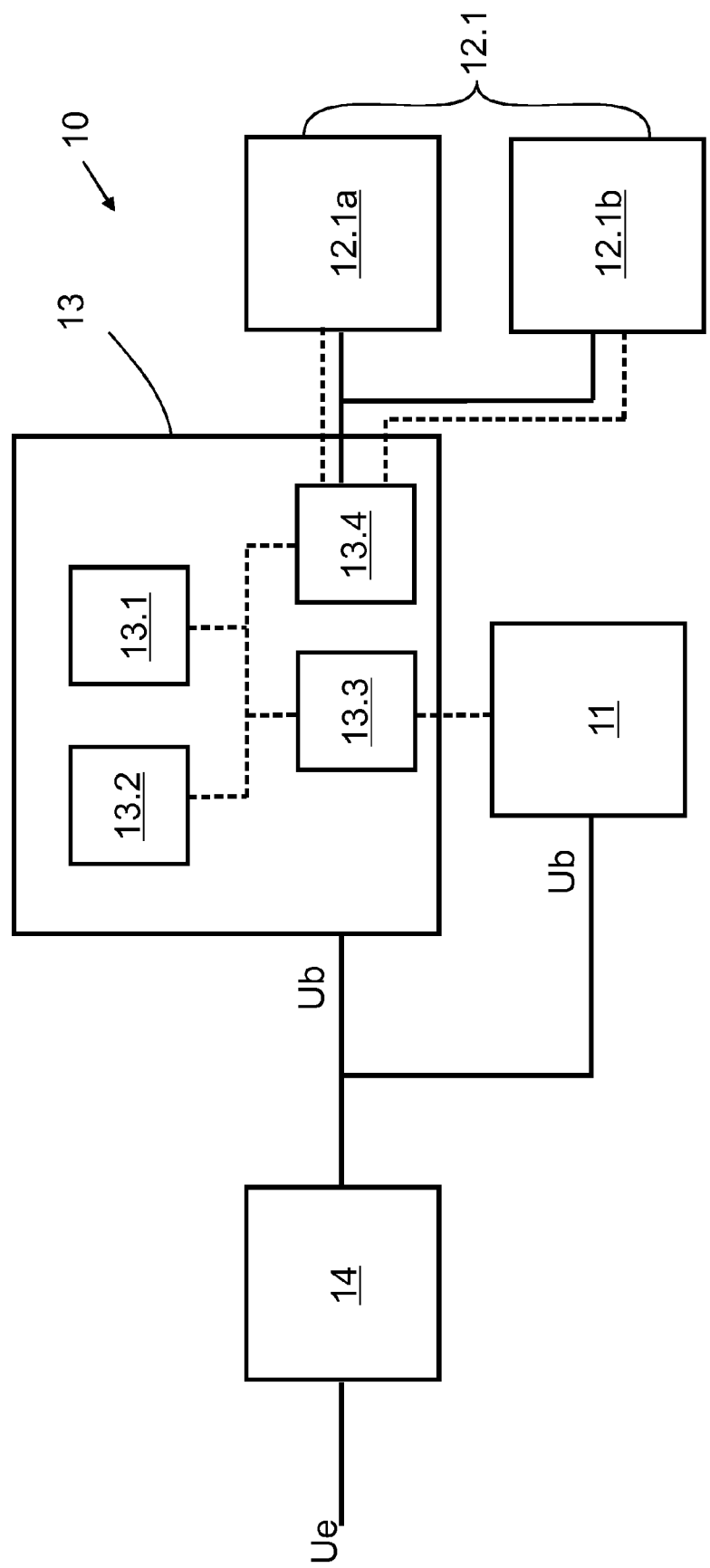
Figure 8:
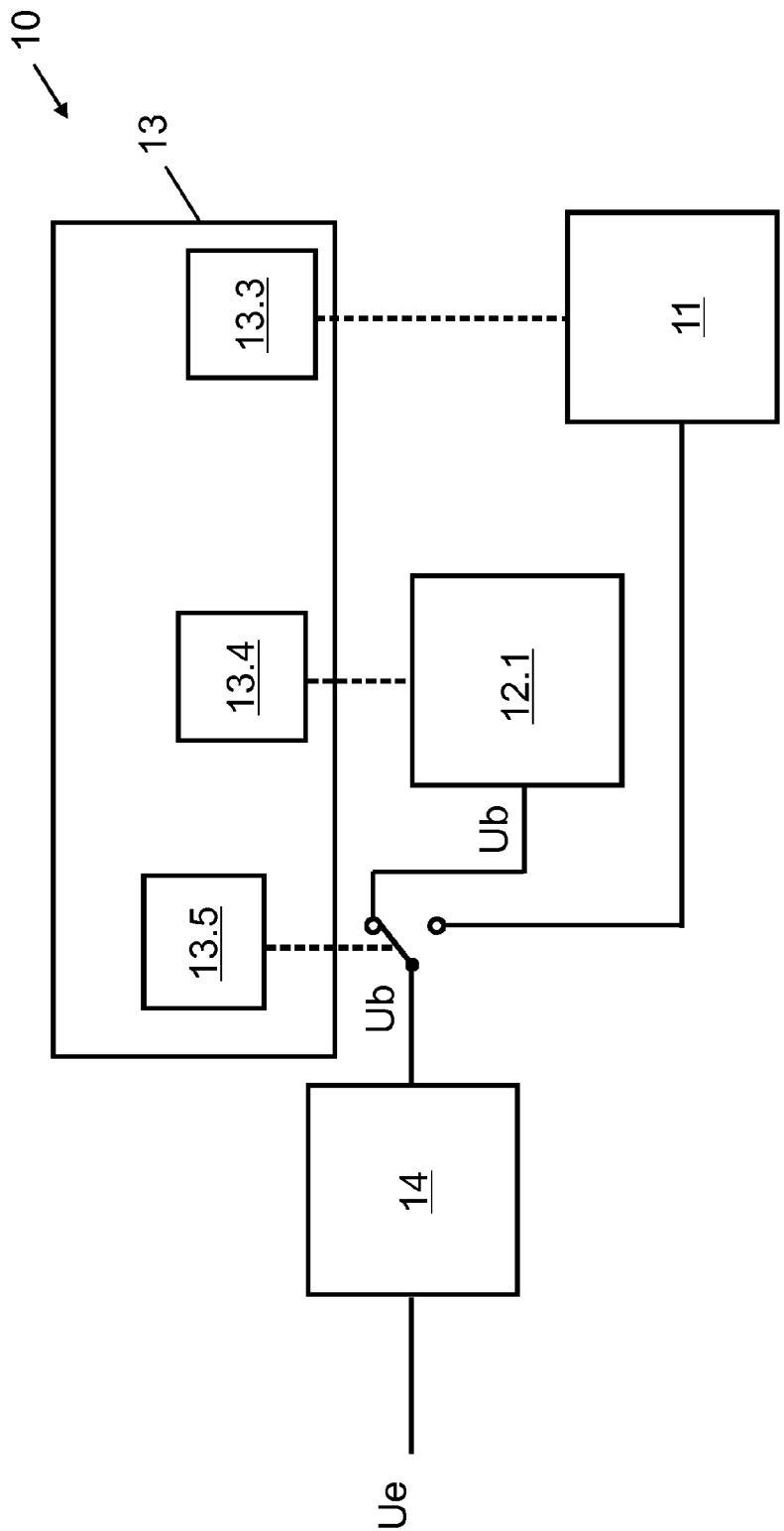
Figure 9:
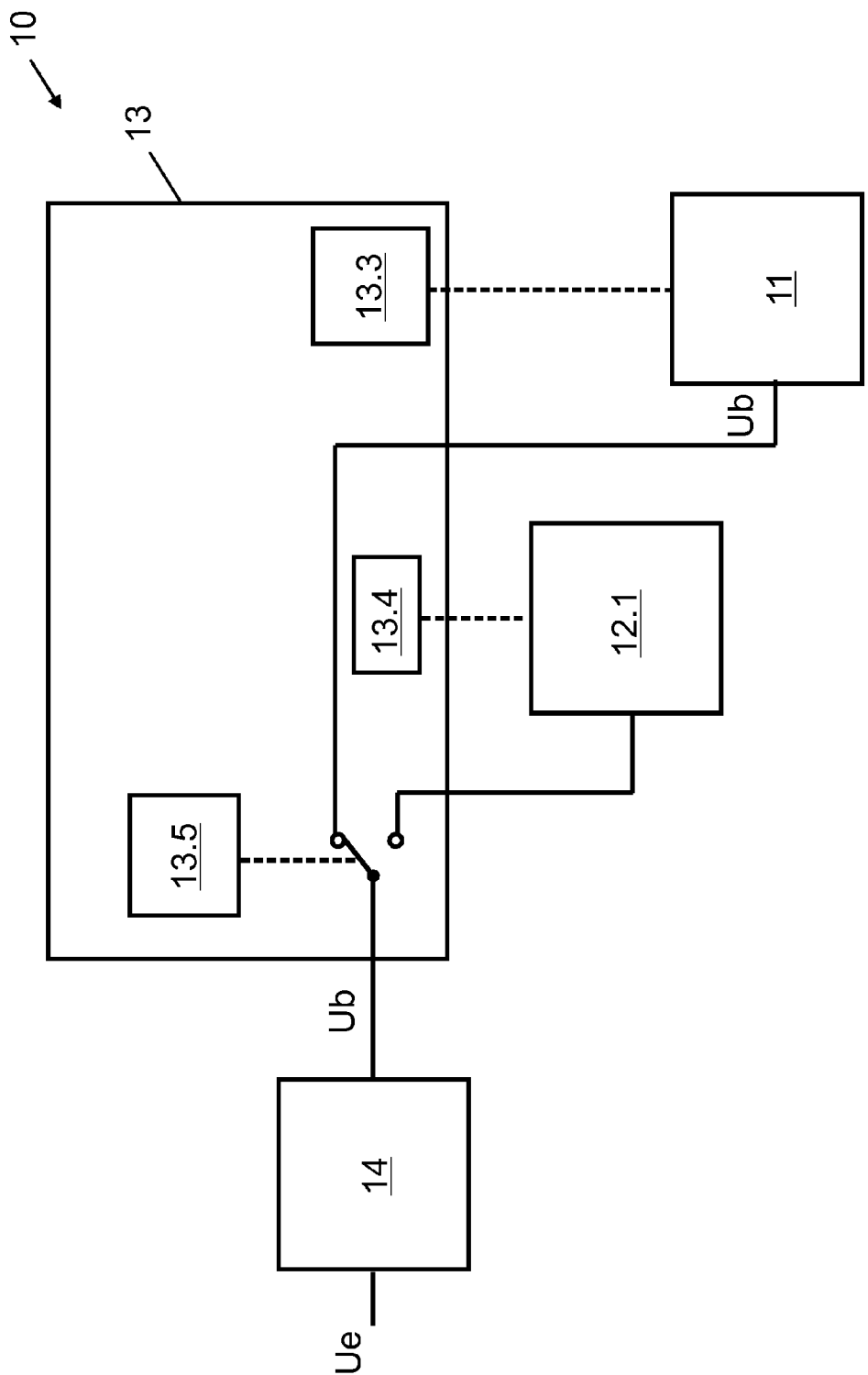
Figure 10:
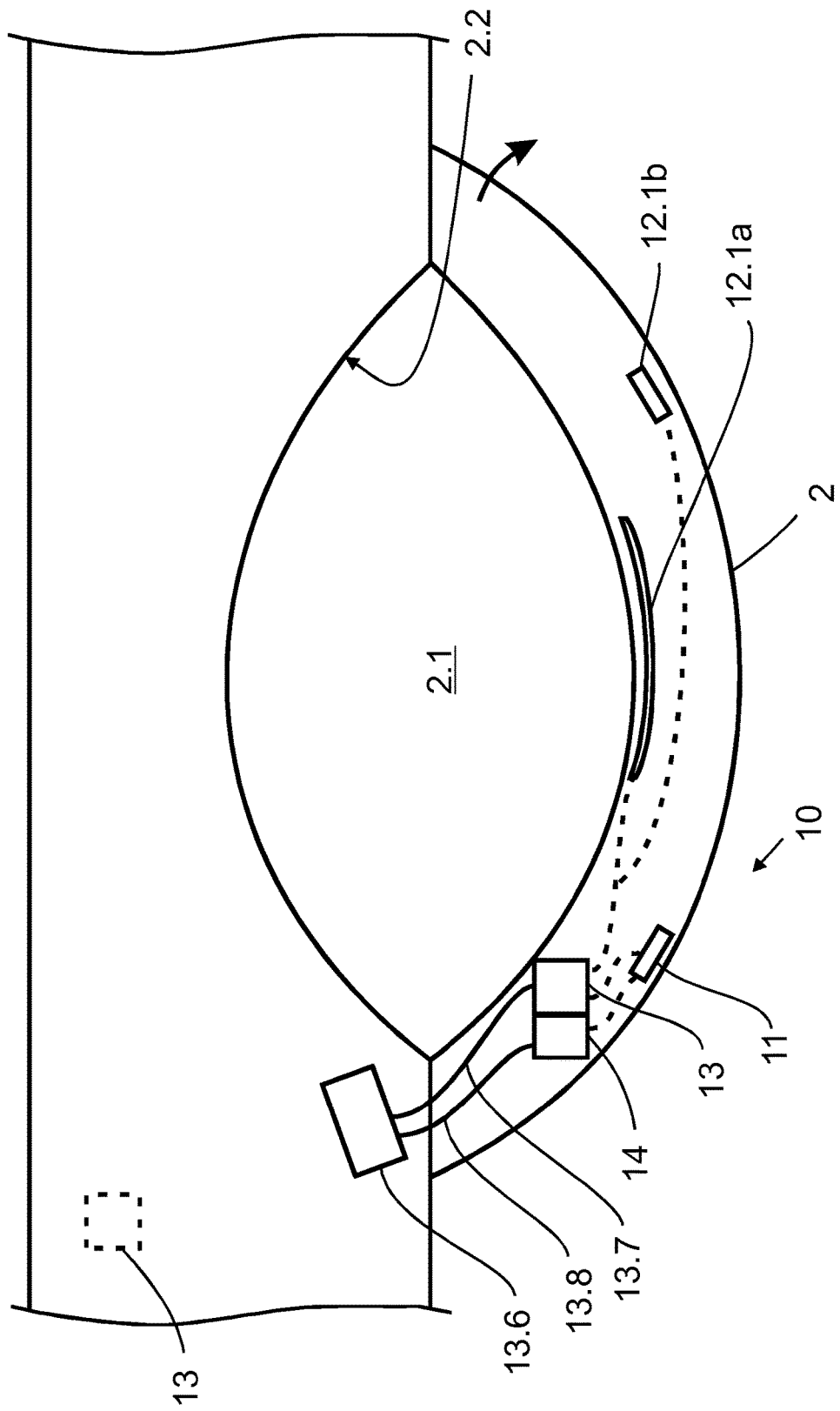

Other advantages, features and details of the invention arise from the following description in which embodiments of the invention are described in detail with reference to the drawings. The features mentioned in the claims and the description can each be essential to the invention individually or in any combination. Shown are:

FIG. 1a a motor vehicle according to the invention, as well as a door handle according to the invention and a device according to the invention in schematic form in a side view, FIG. 1b a further schematic view of a vehicle according to the invention, a door handle according to the invention and a device according to the invention in a top view, FIG. 2 a schematic view of a circuit diagram of a device according to prior art, FIG. 3 an exemplary embodiment of an operating voltage profile of an NFC device as well as of a sensor device, FIG. 4 a schematic representation of a circuit diagram of a device according to the invention, FIG. 5 a representation of a measurement process according to a first exemplary embodiment of the invention, FIG. 6 an additional representation of a measurement process according to a further exemplary embodiment of the invention, FIG. 7 an additional schematic view of a circuit diagram of a device according to the invention according to a further exemplary embodiment, FIG. 8 an additional schematic view of a circuit diagram of a device according to the invention according to a further exemplary embodiment, FIG. 9 an additional schematic representation of a circuit diagram of a device according to the invention according to a further exemplary embodiment, FIG. 10 a schematic representation of an arrangement of a device according to the invention and FIG. 11 a schematic representation for the visualization of a method according to the invention.

In the subsequent figures, identical reference numbers are used for the same technical features, even for those of different exemplary embodiments.

In FIG. 1a, a vehicle 1 according to the invention is shown schematically in a side view, a device 10 according to the invention being arranged, for example, in a door handle 2 according to the invention. Obviously, the device 10 according to the invention as well as the door handle 2 according to the invention can be arranged on all doors, such as driver and passenger side of the vehicle or motor vehicle 1. Here it is also obvious that an arrangement of the device 10 according to the invention on, for example, the handle to open the trunk lid is also possible. All the features that are thus described in connection with the expression "door handle", as obviously also valid for any other handle of the vehicle 1, such as on the trunk lid or hood. An external, in particular mobile, communication device 3, such as a smartphone or laptop, is also shown that has, for example, an NFC interface in order to communicate with the communication device 11, in particular NFC device 11 of the device 10 according to the invention. In addition to the NFC device 11, the device 10 has a sensor device 12 for detecting the approach of an object 4. This is more closely shown in FIG. 1b, a detection area 5 of the sensor device 12 being depicted in a simplified way by dashed lines. The object 4, which is found in the detection area 5 (meaning the area within the dashed lines) and/or enters into the detection area 5, causes a change in capacitance that can be measured by the sensor device 12 in the context of a measurement 20.

As is apparent from FIGS. 1a and 1b, a conjoint arrangement in door handle 2 is provided because of the small communication distance of the NFC device 11 as well as of the detection area 5 of the sensor device 12 in the area of the door handle 2. This ensures that, when an operator approaches, which usually happens within the detection area 5 for opening the door, NFC device 11 can also speak to the operator's communication device 3 (for example, for authentication). This has proven to be disadvantageous, in that the measurement 20 by the sensor device 12 is strongly disrupted by an operation of the NFC device 11. This is discussed in more detail below.

In order to prevent such disruptions, it is therefore known from prior art, as illustrated in FIG. 2, to provide a first voltage device 14a for the sensor device 12, as well as a second voltage device 14b for the NFC device 11 separate and galvanically separated and/or structurally isolated from the first voltage device 14a. Since voltage fluctuations 22.1 arise during the operation of the NFC device 11, in particular during a query and a data exchange, a separate voltage adjustment, meaning, for example, voltage regulation, must take place in the known solutions for similar devices according to FIG. 2. This, however, has the disadvantage that, because of at least two separate voltage devices 14 for voltage adjustment, the device is costlier and more complex to manufacture.

To further understanding, an operating voltage profile 22 is illustrated in FIG. 3, the NFC device 11 being placed in operation at instants t1 and t2 (for example, by a query by the NFC device or a data connection or data exchange). At these instants t1 and t2, therefore, the power requirement for the NFC device 11 is increased and causes the described voltage fluctuation 22.1. The influence of the voltage fluctuations 22.1 is clear in an enlarged area 22.2. Shortly before instant t1, a valid measurement 20.2 by the sensor device 12 takes place. This measurement exceeds reference voltage Uref. Therefore, by this measurement 20.2 the statement can be made that no significant change in capacitance has taken place and thus no object 4 has entered the detection area 5. It is now assumed that no significant change in capacitance or approach of object 4 has occurred at instant t2. Because of the voltage fluctuation 22.1, the next measured value 20.3, however, is below reference voltage Uref. The sensor device 12 therefore falsely reports a change in capacitance or an approach. Measurement 20.3 is thus an invalid measurement 20.3. Such voltage fluctuations 22.1 increasingly occur if a conjoint voltage adjustment of the NFC device 11 and the sensor device 12 is performed using a single voltage device 14. The erroneous measurement can unfortunately result in an erroneous function of the vehicle 1, in which, for example, the doors are opened.

In FIG. 4, the construction of the device 10 according to a first exemplary embodiment is shown, precisely one voltage device 14 being provided. Voltage device 14 has an input voltage (supply voltage (Ue)) and stabilizes this, meaning outputs an operating voltage Ub, which is stabilized or regulated by the voltage device 14 at a predetermined operating voltage Uh. This process corresponds to the voltage adjustment by the voltage device 14. Operating the voltage Ub serves in particular to supply power, that is, to operate, the NFC device 11 as well as the sensor device 12. In this arrangement, the sensor device 12 has an evaluation and control unit 13, which is directly connected to voltage device 14 and thus receives the power supply for the entire sensor unit 12 and, as needed, transmits it to the sensor units 12.1. The NFC device 11 is also connected directly to the voltage device 14. In addition, the sensor device 12 has sensor unit 12.1 that, for example, represents a capacitive detector for the sensor device 12. The power for the sensor unit 12.1 is supplied via the evaluation and control device 13. However, the voltage adjustment of the power supply for the sensor unit 12.1 is directly dependent on the voltage device 14 since no other voltage devices 14 or other devices for voltage adjustment are provided. It is also shown by a dashed line that the evaluation and control device 13 has a data connection and/or an electrical connection to the NFC device 11. In this manner, it is possible for the evaluation and control unit 13 to monitor, for example, the input and output signals of the NFC device 11. If necessary, evaluation electronics for the NFC device 12 can thus also be integrated into the evaluation and control device 13.

FIG. 5 shows how erroneous measurements 20.3 in a measurement 20 by the sensor device 12 caused by voltage fluctuations 22.1 can be reduced. Measurement 20 by the sensor device 12 and simultaneous, a parallel operating profile 21 of the NFC device 11 is thus schematically represented in a corresponding diagram. The temporal profile t of the measurement 20 or of the operating profile 21 is shown here in particular. The same instants of diagrams 20, 21 thus lie directly atop each other in the representation in FIG. 5. It can be seen that, for the capacitance measurement 20 for the sensor device 12, discharge pulses 20.1 are counted in regular intervals, meaning cyclically, until discharge, that is, until reference voltage Uref is reached. For this, clocked discharge of a reference capacitor parallel to the capacitance to be measured takes place, wherein the pulses necessary for discharge can be represented by the illustrated discharge pulse 20.1. Measurements 20.2a and 20.2b thus represent first (20.2a) and second (20.2b) valid measurements, wherein a reduction in the number of discharge pulses 20.1 and thus a change in capacitance can be determined here. No operation of NFC device 11 occurs at the same time as measurements 20.2a and 20.2b. However, evaluation and control device 13 recognizes that, simultaneously to measurements 20.3, interrogation pulse 21.1 by the NFC device 11 and an NFC data exchange 21.2 occurs. These measurements 20.3, consequently interpreted as invalid, are therefore appropriately marked or directly rejected by the evaluation and control device 13. In this manner, invalid measurements 20.3 having erroneous measurement values because of disruptions of measurement 20 can be avoided.

In FIG. 6, a procedure to reduce erroneous measurements 20.3 according to a further exemplary embodiment of the device 10 according to the invention is shown. In this case, evaluation and control device 13 also recognizes the operation of the NFC device 11. However, instead of performing a measurement 20 at this instant and discarding or marking the corresponding erroneous measurements from measurement 20.3, the evaluation and control device 13 instead interrupts the operation, in particular the measurement 20 by the sensor device 12. There is therefore no recording of measured values at these instants. This has, for example, the advantage of further energy savings and a less-complex evaluation.

FIG. 7 shows a schematic design of a device according to the invention according to a further exemplary embodiment. Here it can be seen that the evaluation and control device 13 is electrically connected to the NFC device 11 as well as to the sensor units 12.1, as is represented with a dashed connecting line. The sensor device 12 here has the evaluation and control device 13 as well as a first sensor unit 12.1a and a second sensor unit 12.1b. For improved measurement precision in the sensor device 12, it is also conceivable that still more sensor units 12.1 could be provided. For controlling the NFC device 11, the evaluation and control device 13 also includes an NFC control unit 13.3, which is designed, for example, as a data interface. Likewise, a sensor control unit 13.4 is provided, that is connected to the sensor units 12.1 and can carry out a control and/or measurement evaluation for sensor units 12.1. For this, the sensor control unit 13.4 has, for example, an integrated circuit for capacitance measurement 20, for example, by means of the discharge procedure. The sensor control unit 13.4 as well as the NFC control unit 13.3 are connected to a memory unit 13.1, in particular a non-volatile memory unit 13.1, and an interface unit 13.2 for the vehicle electronics. The evaluation and control device 13 includes the memory unit 13.1 and the interface unit 13.2 or integrates these within an integrated circuit. With this, for example, measured capacitance values from the sensor device 12 or data received by the NFC device 11 can be delivered to the vehicle electronics via the interface unit 13.2. Storage of these data in the memory unit 13.1 is also possible, so that these data can be transferred, for example, by the NFC device 11, to an eternal communication device.

In FIG. 8, an additional schematic representation of an additional exemplary embodiment of the device 10 according to the invention is shown. In order to prevent simultaneous operation of the NFC device 11 and the sensor device 12, the evaluation and control device 13 has a switch unit 13.5. This switch unit 13.5 can switch between an operation and/or a measurement acquisition and/or a power supply of the sensor unit 12.1 and an operation and/or data acquisition and/or a power supply of NFC device 11. The switch unit 13.5 can thus have and/or control a changeover switch, in which, for example, the voltage device 14 is electrically connected to or switched between the evaluation and control device 13, the NFC device 11 and/or the sensor unit 12.1 in order to be able to influence the circuit, as needed.

As is shown in FIG. 9, the changeover switch can also be integrated into the evaluation and control device 13 of the sensor device 12. Thus it may be possible that the power supply for the sensor units 12.1 and for the NFC device 11 takes place via connections of the evaluation and control device 13. The connections are then connected to the changeover switch to control the power supply.

FIG. 10 shows a schematic cross-section of a door handle 2 according to the invention, the arrangement of the device 10 according to the invention, in particular in the interior of the door handle 2, being schematically illustrated. The door handle 2 is arranged here so that it can swivel on an outer surface or door panel 2.2 of a door of a vehicle 1, and has a handle recess 2.1 on the vehicle side. To open or unlock the door, for example, an approach of a hand while gripping into the handle recess 2.1 is detected by the sensor device 12. For opening, the door handle 2 can then be moved or pivoted in the direction of the illustrated arrow. The detection range 5 of the sensor device 12 extends to detect the engagement within the handle recess 2.1, a first sensor unit 12.1a of the sensor device 12 serving as a measurement probe for the change in capacitance caused by the approach. In addition to the first sensor unit 12.1a, a second sensor unit 12.1b is integrated into the door handle 2, whose detection range 5 is away from the handle recess 2.1 in the area of the front side of the door handle 2. Thus, the approach of a hand to close the door handle 2 can be detected, for example, by the second sensor unit 12.1b. This is particularly useful if the device 10 according to the invention is used for a KeylessGo system in the vehicle 1. In this context, an operator just carries an external communication device 3, for example an ID transmitter, laptop or smartphone, which automatically initiates an authentication with the communication device 3 upon detection of an approach by the sensor device 12. In addition, upon an approach an NFC data exchange 21.2 can be initiated, for example, by the sensor device 12 and/or an interrogation pulse 21.1 from NFC device 11. Within the door handle 2, the NFC device 11 thus can also be arranged in particular adjacent to (and, if necessary, contacting) a voltage device 14 and or evaluation and control device 13. An arrangement of the NFC device 11 as close as possible to the voltage device 14 has the advantage that disruptive influences can be reduced. The NFC device 11 thus has, where applicable, a similar detection range 5 to the first or second sensor units 12.1a, 12.1b. It may also be possible, that within door handle 2, a plurality of the NFC devices 11 and/or a plurality of antennas of the NFC device 11 are arranged with differing detection ranges 5. For power supply and/or voltage adjustment, the NFC device 11 is thus electrically connected to the voltage device 14. For data and/or signal exchange, in particular for monitoring input and/or output signals, the NFC device 11 is also electrically connected to the evaluation and control device 13. The appropriate connections are shown in FIG. 10 by dashed lines. Additionally, at least one sensor unit 12.1 within door handle 2 is also connected to the evaluation and control unit 13 for operation, for power supply, for control and/or for measurement acquisition. The evaluation and control device 13 can alternately be arranged outside door handle 2, for example, in the vehicle interior and/or in the vehicle electronics, as is shown by the dashed line. In this manner, for example, a simple connection to the vehicle electronics of the vehicle is possible. In addition, a plug connection 13.6, which has a data link 13.7 as well as an electrical line 13.8 for the power supply, also serves for simple connection to the vehicle electronics, as needed. The voltage device 14, for example, is connected to the supply voltage Ue via line 13.8 for the power supply. The data link 13.7 can be connected to the evaluation and control device 13 and/or directly to the NFC device 11 in order to exchange data (for example, from the data exchange) with the vehicle electronics and/or an external evaluation and control device 13. It is also conceivable that the evaluation and control device 13 forms a monolithic component with the voltage device 14, the evaluation and control device 13, for example, and the voltage device 14 being optionally designed as an integrated circuit, in particular as a micro-controller.

FIG. 11 schematically visualizes a method 100 according to the invention. In this, a control of the NFC device 11 takes place in a first step 100.1, and only thereafter in step 100.2, thus according to a sequential execution, a control of the sensor device 12 by the evaluation and control device 13.

The foregoing explanation of the embodiments describes the present invention only in the context of examples. Of course, individual features of the embodiments, provided they are technically feasible, can be freely combined with each other without departing from the scope of the present invention.

LIST OF REFERENCE NUMBERS

1 Vehicle
2 Door handle
2.1 Handle recess
2.2 Door panel
3 External communication device
4 Object
5 Detection range
10 Device
11 NFC device, communication device
12 Sensor device
12.1 Sensor unit
12.1a First sensor unit
12.1b Second sensor unit
13 Evaluation and control device
13.1 Memory unit
13.2 Interface unit for vehicle electronics
13.3 NFC control unit
13.4 Sensor control unit
13.5 Switching unit
13.6 Plug connection
13.7 Data link
13.8 Electrical line
14 Voltage device
14a First voltage device
14b Second voltage device
20 Measurement of the sensor device/capacitance measurement
20.1 Discharge pulses, cycles
20.2 Valid measurement
20.2a First valid measurement
20.2b Second valid measurement
20.3 Erroneous measurement
21 Operating profile of the NFC device/communication device
21.1 Inquiry pulse
21.2 NFC data exchange
22 Operating voltage profile
22.1 Voltage fluctuations
22.2 Increased range
100 Method
100.1 First step
100.2 Second step
Ub Operating voltage
Ue Supply voltage
Uh Specified operating voltage level Uref Reference voltage
t Time
t1 First instant
t2 Second instant

The invention claimed is:

1. A device for data and measurement acquisition for a door handle of a vehicle comprising:
   at least one communication device;
   at least one sensor device for measurement of a change in capacitance;
   one voltage device electrically connected to both of the at least one communication device and the at least one sensor device, the one voltage device for conjoint voltage adjustment of the at least one communication device and the at least one sensor device;
   an evaluation and control device electrically connected to both the at least one communication device and the at least one sensor device, the evaluation and control device configured to:
      monitor operation activity of both of the at least one communication device and the at least one sensor device; and
      prevent an erroneous measurement of the at least one sensor device by at least one of:
         (a) determining an at least partially simultaneous operation of the at least one communication device and the sensor device, and, in response to determining the at least partially simultaneous operation of the at least one communication device and at least one sensor device, rejecting the detected operation of the at least one sensor device as erroneous; or
         (b) detecting an operation of the at least one communication device and, in response to detecting an operation of the at least one communication device, interrupting operation of the at least one sensor device during the operation of the at least one communication device.

2. The device according to claim 1, wherein the voltage adjustment of the at least one communication device and the at least one sensor device can be directly carried out via the voltage device.

3. The device according to claim 1, wherein the evaluation and control device is configured to metrologically detect the at least partially simultaneous operation of the communication device and the sensor device at an instant.

4. The device according to claim 1, wherein the evaluation and control device has a data connection to at least one of the at least one communication device, the at least one sensor unit, and to a vehicle electronics.

5. The device according to claim 1, wherein via the evaluation and control device, data from the data exchange of the communication device can be at least received, evaluated or transferred to vehicle electronics that can be connected to the evaluation and control device.

6. The device according to claim 1, further comprising a non-volatile memory unit, the non-volatile memory unit including data that is at least one of transferable or receivable by the communication device.

7. The device according to claim 1, further comprising a switching unit configured to switch between an operation of at least one sensor unit of the sensor device and the communication device in order to reduce disruptions of the measurement.

8. The device according to claim 7, wherein the switching unit is integrated in the evaluation and control unit.

9. The device according to claim 1, wherein the communication device is an NFC device for NFC data exchange with an external communication device.

10. A method for operating a device for data and measurement acquisition for a door handle of a vehicle comprising:
    monitoring, by an evaluation and control device electrically connected to at least one communication device and at least one sensor device for measuring a charge in capacitance, operation activity of both of the at least one communication device and the at least one sensor device; and
    preventing an erroneous measurement of the at least one sensor device by at least one of:
       (a) determining an at least partially simultaneous operation of the at least one communication device and the sensor device, and, in response to determining the at least partially simultaneous operation of the at least one communication device and at least one sensor device, rejecting the detected operation of the at least one sensor device as erroneous; or
       (b) detecting an operation of the at least one communication device and, in response to detecting an operation of the at least one communication device, interrupting operation of the at least one sensor device during the operation of the at least one communication device;
    wherein the at least one communication device and the at least one sensor device are electrically connected to precisely one voltage device, and wherein the one voltage device serves for conjoint voltage adjustment of the at least one communication device and the at least one sensor device.

11. The method according to claim 10, further comprising:
    cyclically initiating, by the evaluation and control device, a measurement by the sensor device; and
    carrying out, by the communication device, a query in temporal dependency on the measurement.

12. The method according to claim 10, further comprising operating, via the voltage device, the communication device and the sensor device with an equal electrical operating voltage or are connected to an equal electrical potential.

13. The method according to claim 10, further comprising cyclically carrying out, by the communication device, a query in order to detect a communication-ready, external communication device, wherein such a query of the communication device always being metrologically determined by the evaluation and control device.

14. The method according to claim 13, further comprising:
    wherein, upon recognition of the communication-ready external communication device, sending, by the communication device, an interrupt request to the evaluation and control unit to initiate a data exchange; and
    interrupting, by the evaluation and control device, the measurement acquisition of the sensor device during the data exchange.

15. The method according to claim 10, wherein the monitoring the operation activity of the at least one sensor device comprises carrying out, by the evaluation and control device, a measurement acquisition of the sensor device at least as a function of an output signal from the communication device that is received by the evaluation and control unit, or as a function of an input signal sent by the evaluation and control device to the communication device.

16. A device for a door handle of a vehicle, comprising:
a communication device;
a sensor device configured to measure a change in capacitance;
a power supply;
a voltage regulator coupled to (i) the power supply, (ii) the communication device, and (iii) the sensor device; and
an evaluation and control device electrically connected to both the at least one communication device and the at least one sensor device, the evaluation and control device configured to:
  monitor operation activity of both of the at least one communication device and the at least one sensor device; and
  prevent an erroneous measurement of the at least one sensor device by at least one of:
    (a) determining an at least partially simultaneous operation of the at least one communication device and the sensor device, and, in response to determining the at least partially simultaneous operation of the at least one communication device and at least one sensor device, rejecting the detected operation of the at least one sensor device as erroneous; or
    (b) detecting an operation of the at least one communication device and, in response to detecting an operation of the at least one communication device, interrupting operation of the at least one sensor device during the operation of the at least one communication device;
  wherein the voltage regulator is configured for conjoint voltage adjustment of the communication device and the sensor device.

* * * * *